Feb. 4, 1941.  M. H. ARMS  2,230,442
ANTIFRICTION SLIDE
Filed July 20, 1938   4 Sheets-Sheet 1
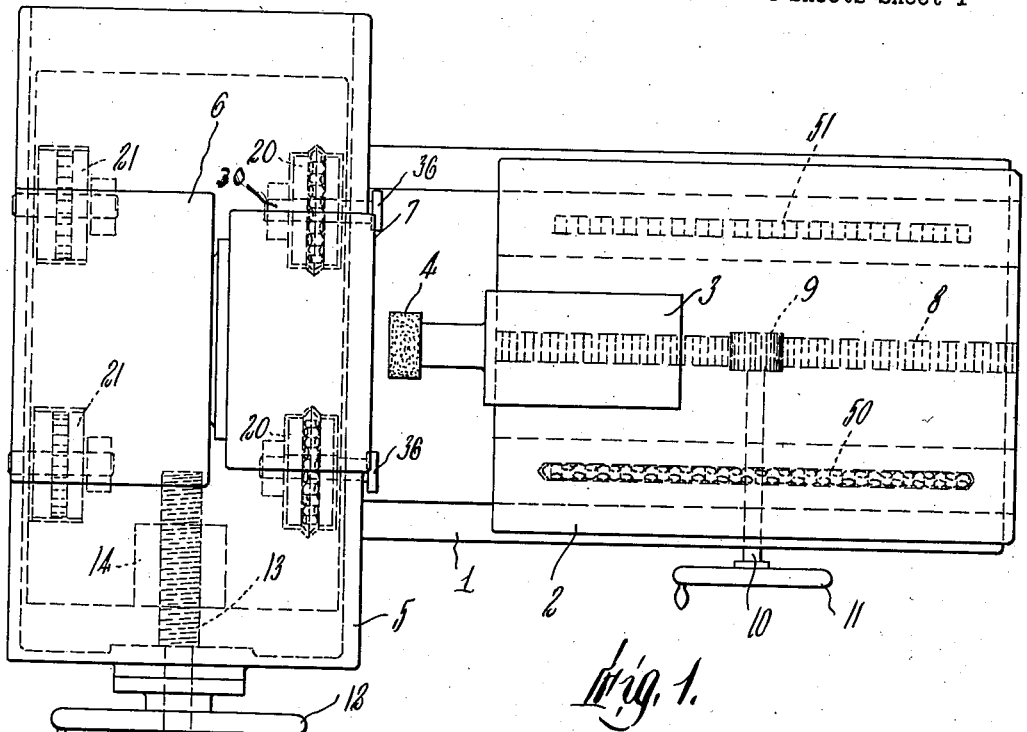
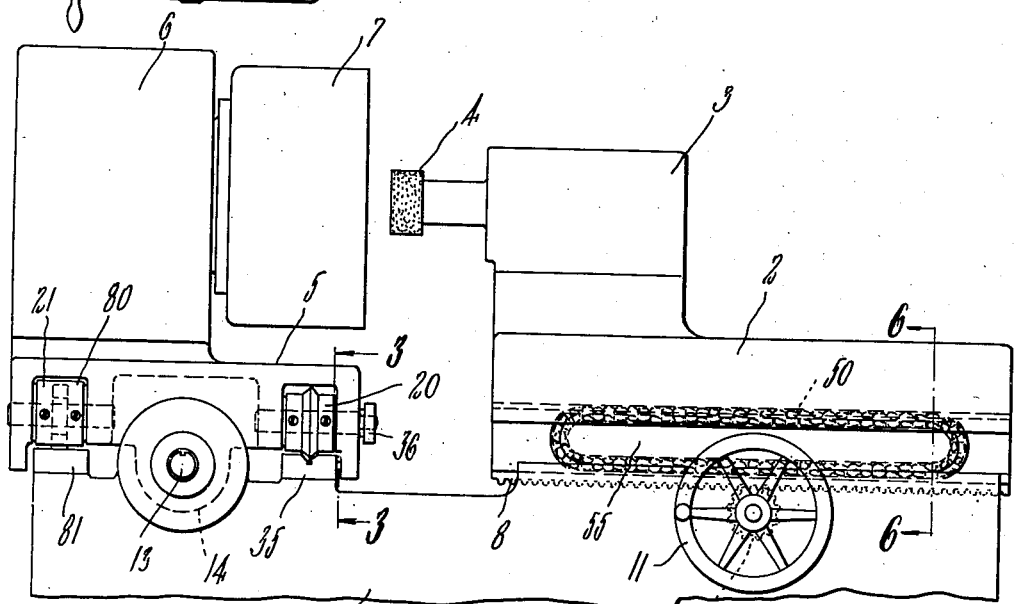

Feb. 4, 1941. M. H. ARMS 2,230,442
ANTIFRICTION SLIDE
Filed July 20, 1938 4 Sheets-Sheet 2
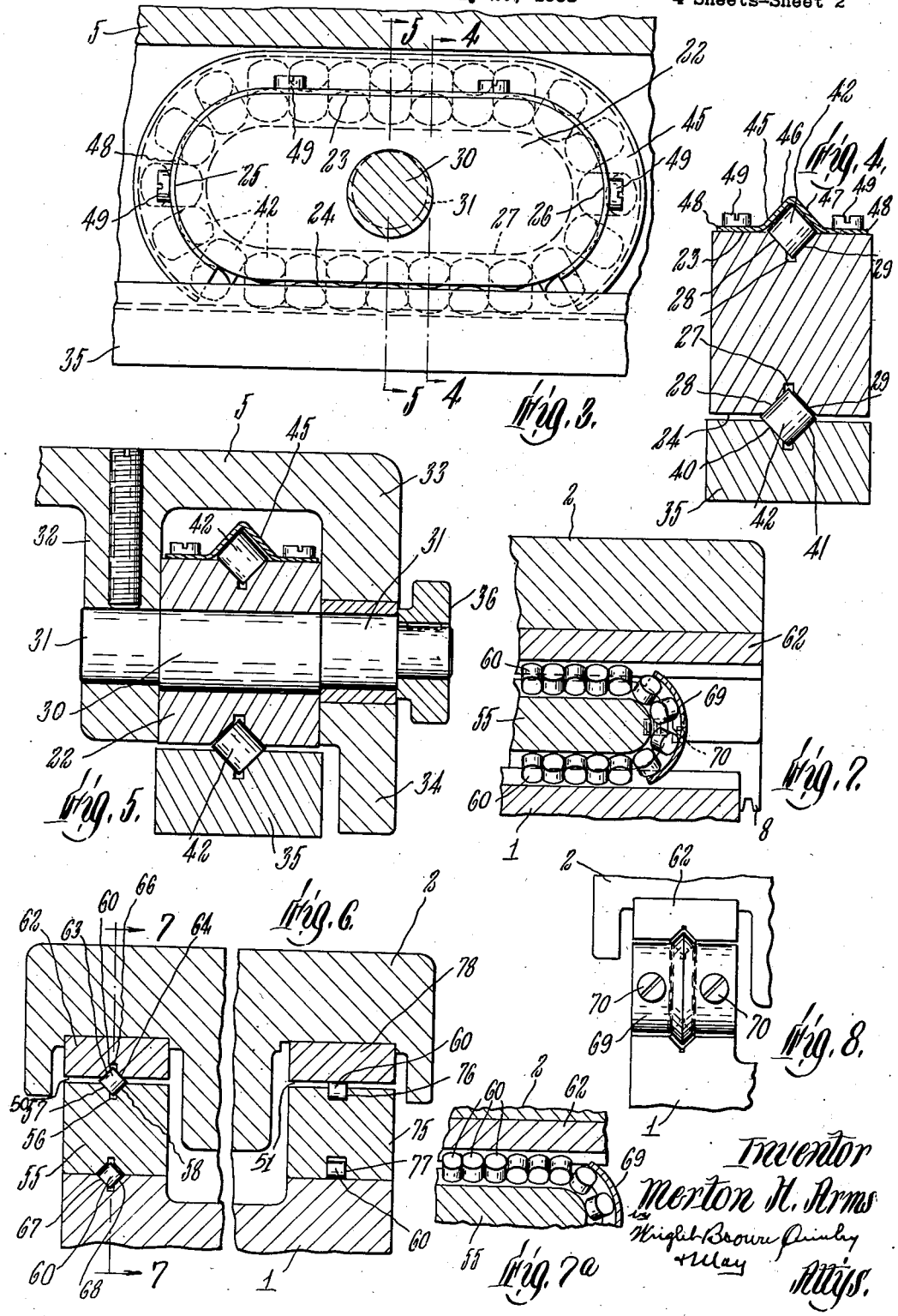

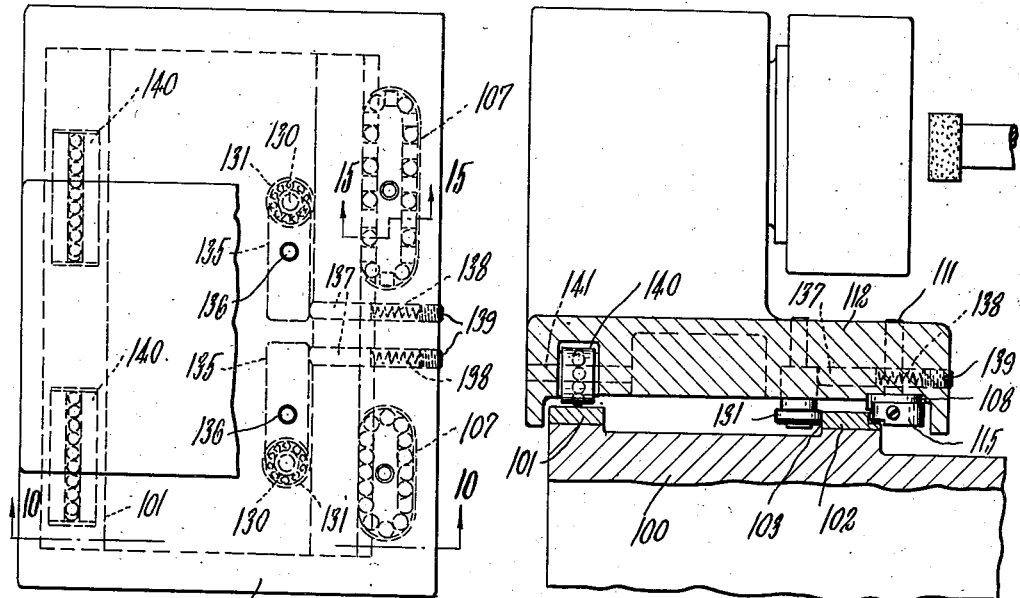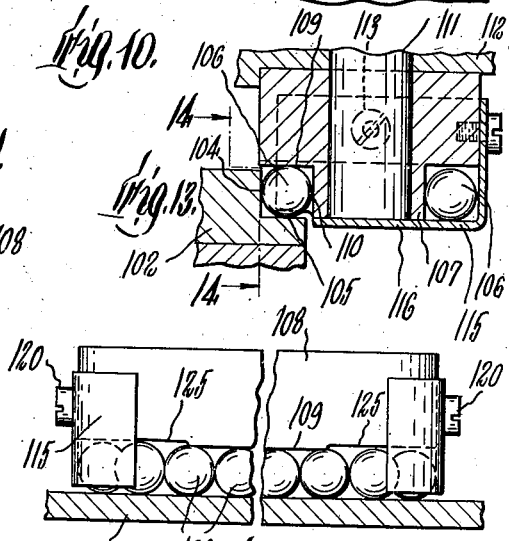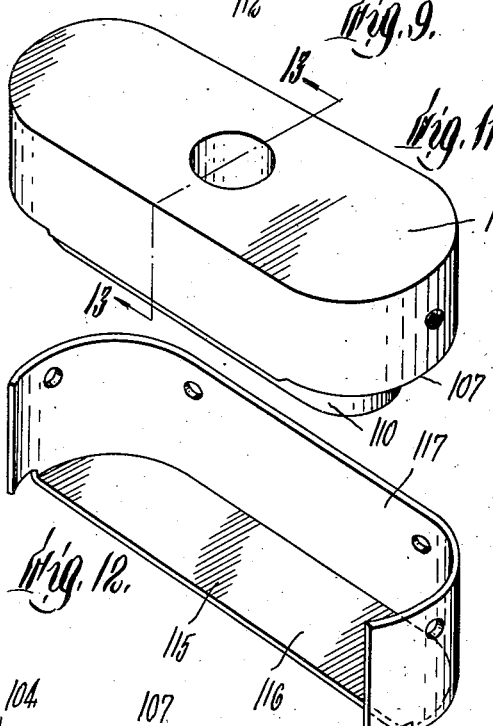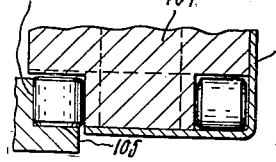

Feb. 4, 1941.                M. H. ARMS                2,230,442
                           ANTIFRICTION SLIDE
                          Filed July 20, 1938            4 Sheets-Sheet 4
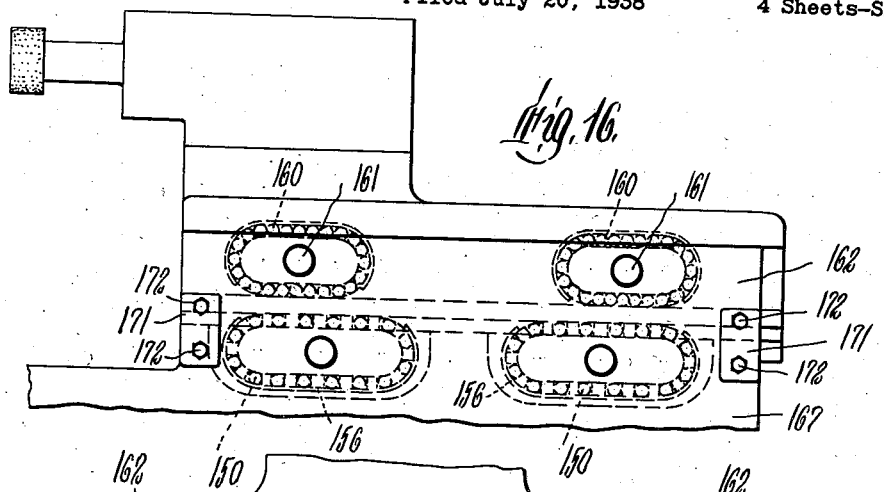
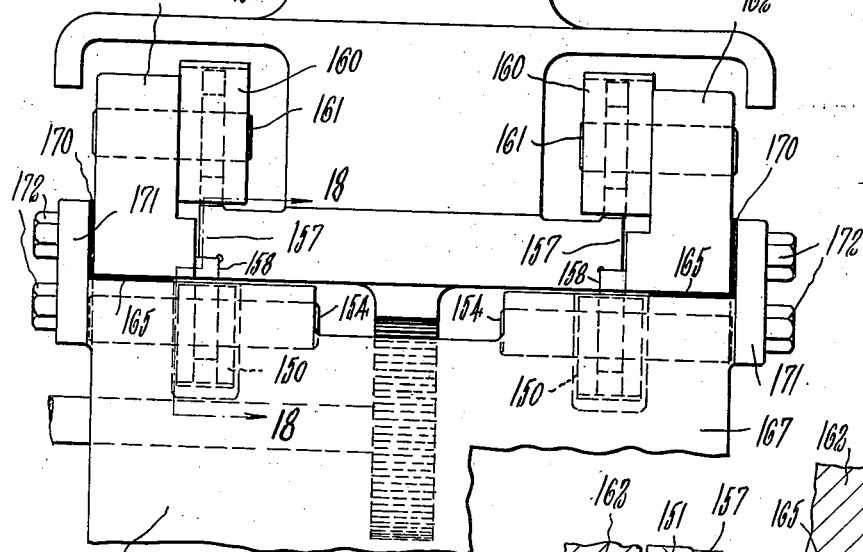
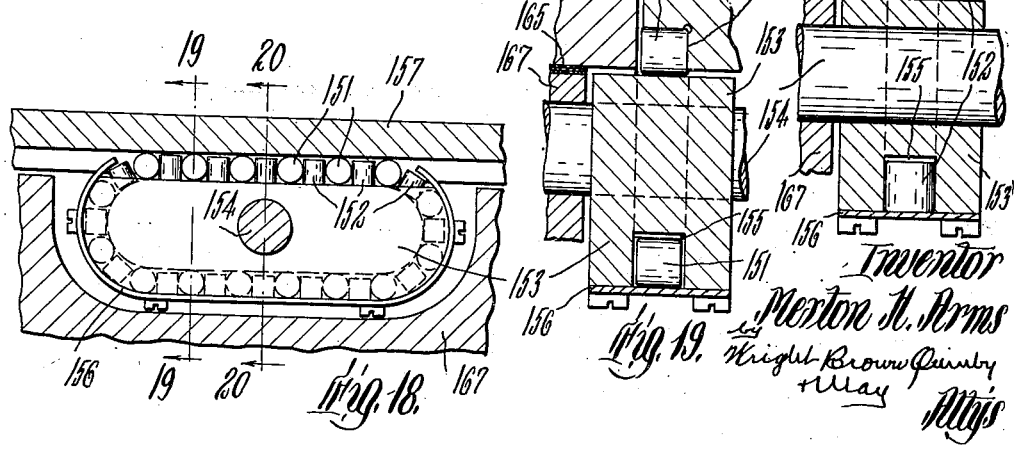

Patented Feb. 4, 1941

2,230,442

UNITED STATES PATENT OFFICE 2,230,442

ANTIFRICTION SLIDE

Merton H. Arms, Springfield, Vt., assignor to Bryant Chucking Grinder Company, Springfield, Vt., a corporation of Vermont Application July 20, 1938, Serial No. 220,294

7 Claims. (Cl. 308—6)

This invention relates to the antifriction mounting of slides, such, for example, but not limited thereto, as those supporting either work or tools where relative reciprocation of work and tools is desired.

One object of the present invention is to provide such mountings which will insure proper guidance of the antifriction elements so that they will be maintained in proper positions and while the slide is supported against loads applied in different angular directions, as, for example, both vertically and horizontally.

A further object of the invention is to provide such mountings wherein the antifriction elements are movable in an endless path, but wherein the slide is supported for rectilinear motion, although the antifriction bearing elements may at times be moving in other directions.

A further object, particularly where the loads are heavy, is to provide a mounting wherein rollers rather than balls are employed, rollers having greater carrying capacity since they have line contact rather than point contact as in the case of balls.

A further object is to provide multiple antifriction means, a portion of which is adapted to take both vertical and lateral loads, and another portion of which may, if desired, take vertical loads only.

Where the antifriction means is arranged to take lateral as well as vertical loads, it is a further object of this invention to provide constructions in which the antifriction elements are so supported as to properly guide and support the slide and go into and out of action in the proper manner.

Still another object is to provide mountings having the advantages hereinbefore mentioned and which will provide for lifting force as well as for downward and lateral forces and which may be loaded to prevent play in any direction out of the line of traverse.

For a more complete understanding of this invention, reference may be had to the accompanying drawings, in which Figure 1 is a somewhat diagrammatic top plan view of a grinding machine showing a wheel slide and a cross work slide, the mounting of each embodying the invention, but in somewhat different forms.

Figure 2 is a fragmentary front elevation of the same.

Figure 3 is a detail section to a larger scale on line 3—3 of Figure 2.

Figures 4 and 5 are detail sections on lines 4—4 and 5—5, respectively, of Figure 3.

Figure 6 is a detail section to a larger scale on line 6—6 of Figure 2.

Figure 7 is a detail section on line 7—7 of Figure 6.

Figure 7a is a view similar to a portion of Figure 7, but showing a modification.

Figure 8 is a fragmentary elevation showing one end of the roller housing shown in section in Figure 7.

Figure 9 is a top plan view partly broken away showing a cross work slide supported both on balls and rollers.

Figure 10 is a section on line 10—10 of Figure 9.

Figures 11 and 12 are perspective views of two members of the ball cartridge shown in Figures 9 and 10.

Figure 13 is a detail section through the ball cartridge and the cooperating raceway on line 13—13 of Figure 11.

Figure 14 is a side elevation of the ball cartridge.

Figure 15 is a detail section on line 15—15 of Figure 9.

Figure 16 is a fragmentary elevation somewhat similar to a portion of Figure 2, but showing a modification wherein the slide is supported against upward pressure.

Figure 17 is an end elevation of the same.

Figure 18 is a detail section on line 18—18 of Figure 17.

Figures 19 and 20 are detail sections on lines 19—19 and 20—20, respectively, of Figure 18.

Referring first to Figures 1 and 2, at 1 is indicated a support, herein shown as the bed of an internal grinding machine, though it will be understood that it might be any support for receiving one or more slides or carriages movable relative thereto. The support as shown carries two such slides or carriages. One of these, indicated at 2, has mounted thereon a head 3 rotatably supporting in any suitable manner a grinding wheel 4. The other slide or carriage is shown somewhat diagrammatically at 5 and supports a head 6 in which is rotatably mounted a work holder 7 of any suitable description for supporting work to be operated upon by the grinding wheel 4. The carriage 2 is shown as mounted for horizontal movement from and toward the slide or carriage 5, while the slide or carriage 5 is mounted for movement transverse to the axis of the grinding wheel 4. For the purpose of moving the slide 2 there is indicated a conventional means comprising the rack bar 8 carried by the slide within which meshes a pinion 9 carried by a shaft 10 having a hand wheel 11 on its outer end by which it may be rotated, causing rotation of the pinion 9 engaging the teeth of the rack 8 to move the carriage 2. The traverse carriage 5 may be moved in its path by any suitable means, but as herein shown this is effected by rotation through a hand wheel 12 of a feed screw 13 engaging in a threaded block or nut 14 carried by the carriage 5. Both the carriages 2 and 5 are mounted on antifriction bearings embodying the invention.

The carriage 5 is supported on two pairs of bearings 20 and 21. Each of the bearings 20 is arranged to take both vertical and horizontal load, thus acting to guide the carriage or slide 5 in a straight path. As shown best in Figures 3, 4 and 5, each of the bearings 20 consists of a bearing cartridge having a block 22 having flat upper and lower faces 23 and 24 and curved end faces 25 and 26. Around the top and bottom and end faces there extends a continuous endless trackway 27 having angularly related track faces 28 and 29. The block 22 is rockingly supported by the carriage 5 on a trunnion 30 which extends therethrough and which is provided with eccentric end pivot portions 31. As shown best in Figure 5, these eccentric portions are journaled in ears 32 and 33, depending in spaced relation from the carriage 5, and beyond the ear 33, which has an apron extension 34 extending down over a track member 35 of the support 1, the trunnion 30 may have keyed thereto an adjusting hand wheel or nut 36. By turning this element 36, the block 22 may be adjusted vertically to the extent of the eccentricity of the end portions of the trunnion 30, so as to facilitate leveling of the slide 5 and to provide for slight inaccuracies in machining or the like. The trackway 35 is provided with relatively inclined bearing faces 40 and 41 opposed to the faces 29 and 28, respectively, of the block 22, and between the opposed faces of the block 22 and the track member 35 are positioned the rolling bearing elements 42. As shown these bearing elements are cylindrical rollers slightly shorter than their diameters, and they are arranged in groups, the rollers of one group having rolling contact with the faces 28 and 41 and the rollers of the other group having rolling contact with the bearing faces 29 and 40. As shown in Figure 3, these rollers of each group are arranged alternately, but instead they might be arranged in sets of a plurality of rollers arranged in one angular position, interposed between sets of rollers arranged in the other angular position as illustrated in Figure 7a in which three rollers are arranged together with their axes parallel and in one angular position and the next adjacent three are arranged with their axes angularly related to the first. With this arrangement the rollers take side thrust in opposite directions, one group of rollers taking such thrust in one direction, and the other group taking the thrust in the opposite direction. The bearing member 35 extends throughout the distance to which the bearing cartridge is translated in the sliding motion of the carriage 5, and in order that the rollers may be returned from one end to the other of the cartridge about the ends and top of the block 22, this block 22 is provided with a top and end roller retainer cover such as 45. This cover also is provided with angularly related walls 46 and 47 oppositely disposed to the walls 29 and 28 of the top and end faces of the block 22, but the trackway about the top and ends is of sufficient depth so that the rollers may pass freely therein, no load being taken by them in these portions of their path of motion. The cover member 45 may be secured to the block 22 and for this purpose it is shown as provided with flanges 48 which overlie the top face of the block 22 and may be secured thereto as by means of the cap screws 49.

The carriage 2 is likewise supported on a pair of rolling anti-friction bearings 50 and 51, one of these, such as the bearing 50, being designed to take horizontal as well as vertical load and to properly guide the carriage for straight line motion. This bearing 50, however, differs from the bearings 20 in that it is not provided with a cartridge for supporting the rolling elements. Referring to Figures 6, 7 and 8, a block 55 is secured to the upper face of the support 1 and it is provided on both upper and lower faces and around its ends with a trackway 56 having angularly spaced side walls 57 and 58 for the reception of the rolling elements, shown as rollers 60, which like the rollers 42 of the bearing cartridges 20, are arranged in groups of one or more, the rollers of one group having rolling contact with the walls 57 and the rollers of the other group having rolling contact with the walls 58. In this construction, the top stretch of the rollers supports the carriage mounted thereon and to this end this carriage is provided with a track piece 62 having a trackway 66 therein on its under face provided with the inclined walls 63 and 64 oppositely disposed to the walls 58 and 57, respectively. The upper face of the support 1 is provided with a trackway cooperating with the lower face trackway of the block 55 and provided with inclined faces 67 and 68 spaced from the walls 57 and 58 sufficiently to permit the free passage of the rollers 60. In order to guide rollers between the upper and lower track faces and around the ends of the block 55, curved retaining plates such as 69, shown in Figures 7 and 8, may be employed, which may be secured in position as by the cap screws 70 as shown in Figure 8.

The bearing 51 is arranged to take vertical load only and as shown in Figure 6, it comprises the bearing block 75 having a continuous trackway therearound having an upper relatively shallow straight stretch 76, a lower deep stretch 77, which stretches are connected about the ends of the block in a manner similar to that shown in Figure 5, and with end cover members (not shown), but similar to the end cover members 69 of Figures 7 and 8, to guide the rollers from one to the other of the upper and lower stretches of the trackway. The slide 2 is provided with a track piece 78 which rests on the rollers 60 in the upper stretch 76, while the trackway 77 is sufficiently deep of itself to completely house the rollers 60 which move therein in the return direction in which they bear no load. Within the trackway 76 the axes of the rollers are all arranged horizontally.

The bearings 21 which support the sliding carriage 5 are also similarly arranged to take vertical load only, and differ from the bearings 51 only in that they are provided with cartridges 80 (Figure 2) pivotally secured in a manner similar to the cartridges of bearing 20, their rollers being all arranged with horizontal axes and bearing on the flat track piece 81 of the support 1.

In Figures 9 to 14 is illustrated modified constructions in which the sliding carriage is supported on one set of rolling bearings adapted to take both horizontal and vertical loads, and another set taking vertical loads only, and in which, except in the upper right hand portion of Figure 9, balls rather than rollers are employed. Referring to these figures, the support is indicated at 100 carrying a pair of track members 101 and 102. The track member 101 is designed to support the bearings adapted to take vertical load only, and the track 102 is designed to cooperate with bearings adapted to take both vertical and horizontal load. The trackway 102 is shown as provided with an upright bearing face 103 along one side and an upright bearing face 104 and a horizontal bearing face 105 along its opposite side, the bearing faces 104 and 105 being formed by cutting away the upper edge portion of the track member. Cooperating with these faces 104, 105 are the balls 106 of the bearing cartridge 107. This bearing cartridge, as shown, comprises a block 108 having angularly disposed bearing faces 109 and 110, oppositely disposed to the bearing faces 105 and 104, respectively, of the track member 102. This block 108 is shown as pivoted as on the vertical trunnion 111 to the under face of the carriage or slide 112, and is fixed to the trunnion 111 as by means of the set screw 113. The trackway comprising the track faces 109 and 110 is continued around the ends and opposite side of the block 108, but as around these ends and opposite side there is no corresponding trackway such as the face 105 on which these balls may rest, a cover member 115 is provided which has an under face portion 116 underlying the block 108 and an upright side and end wall portion 117 which retains the balls in their trackway 104 where they are unsupported by the track member 102. This cover member 115 may be secured to the block as by the screws 120.

It is important that the balls 106 support the weight of the carriage only while they are traveling in a straight path, as otherwise there might be a tendency for the carriage to move out of its straight path and to be erratic in its action. For this purpose the upper face 109 of the block trackway is relieved, being cut away as at 125, adjacent to the ends of the block 108 and within the straight stretch, so that by the time the balls are constrained to move out of straight line, or until after they have been brought into straight line arrangement, they do not support weight. This is clearly shown in Figure 14. Provision is made for yieldingly holding the ball cartridge against the vertical face 104 of the trackway 102. For this purpose there is shown oppositely disposed to each of these cartridges a ballbearing 130 having its outer raceway member 131 bearing against the face 103 of the track member 102. This ballbearing is carried by a lever 135 fulcrumed at 136, and bearing against the opposite end portion of the lever 135 from the bearing 130 is a spring pressed plug 137 seated in a socket in the carriage 112 and against the outer end of which bears a spring 138 backed up by a threaded plug 139 which closes off the outer end of the socket.

Besides these bearings which are adapted to take horizontal as well as vertical loads, bearings adapted to take vertical load only may also be employed, as, for example, at 140. These bearings may be essentially the same in construction as the bearings 80 shown in Figures 1 and 2, except that balls instead of rollers are employed, these being carried by a cartridge fulcrumed on a horizontal pivot 141.

In place of employing the balls shown in the cartridges 107, cylindrical rollers may be employed, if desired, and arranged in two sets, one bearing against the vertical wall 104 and the other bearing against the horizontal wall 105 as shown in the upper right hand portion of Figure 9 and Figure 15, the construction otherwise being identical with the ball cartridge bearing shown in Figures 9 to 14, inclusive.

Figures 16 to 20, inclusive, illustrate a further modification in which provision is made to take care of upward as well as downward and lateral pressures. Due to the action of a tool such as a cutter or grinding wheel on work, there may be a tendency to lift the carriage. Beside the supporting antifriction bearings which take the weight of the carriage and parts supported thereby, additional antifriction bearings may be placed above the carriage to hold it down, and in order that there may be no play or looseness in any direction out of the line of travel, the parts may be pre-loaded As shown the supporting antifriction bearings 25 at 150 are of the roller cartridge type with alternate rollers 151 and 152 having their axes horizontal and vertical, respectively. These rollers are supported by the blocks 153 rockably mounted on the shafts 154. The under and end faces of each block 153 are grooved, as at 155, to receive the rollers, and a plate 156 having its ends upwardly and inwardly curved retains the rollers in the groove. Lateral extensions 157 of the carriage are angularly recessed at 158 to have vertical bearing on the horizontal rollers and lateral bearing on the vertical rollers on the top face of the blocks 153. Upper cartridges 160 with their rollers horizontal and pivoted on the horizontal pivot shaft 161 to side rails 162 bear on the top face of the extensions 157. The amount of vertical loading may be determined by any suitable means, as, for example, by the use of shims 165 arranged between the side rails 162 and the support or bed 167, which carries the pivot shafts 154 for the lower cartridges.

The horizontal loading may be provided by adjusting one or both of the side rails 162 toward the lateral center of the support or bed 167. One means for doing this comprises the shims 170 positioned between the outer faces of the rails 162 and plates 171 secured as by screws 172 to the bed or support 167 and to the side rails 162 at suitable points as adjacent to their ends, and which secure the rails 162 to the bed or support 167 to provide for the vertical loading.

From the foregoing description of certain embodiments of this invention, it should be evident to those skilled in the art that various changes and modifications might be made without departing from the spirit or scope of this invention as defined by the appended claims.

I claim:

1. In combination, a pair of members comprising a support and a carriage movable on said support, an antifriction cartridge having an endless track for antifriction elements carried by one of said members, said track having a straight stretch and a return stretch connecting the ends of said straight stretch, said straight stretch having a pair of angularly disposed bearing faces, the other of said members having angularly disposed bearing faces oppositely disposed to the bearing faces of said straight stretch, antifriction elements carried in said cartridge and contacting with said angularly disposed bearing faces of said cartridge track at said straight stretch and of said other member, said cartridge having means for supporting said elements while out of contact with said other member in said return stretch, certain of said angularly disposed cartridge track faces being relieved adjacent to the ends of and within said straight stretch to remove load from the elements opposite thereto as said elements are approaching or are about to recede from said stretch.

2. In combination, a support having angularly related straight bearing surfaces, a block having an endless path for the reception of rolling bearing elements, said path having angularly related faces, a portion of said path being straight, a carriage to which said block is attached with the angularly related faces in said straight portion opposed to the angularly related faces of said support, rolling bearing elements in said path and in said straight stretch being supported by said support bearing surfaces, and a cover member carried by said block and supporting said elements in said path elsewhere than in said straight portion, said block having relieved face portions in said path at the end portions of and beyond its straight portion to remove load from said rolling elements except when they are in the unrelieved part of said straight portion.

3. In combination, a support, a track member on said support presenting an upright face on one side and an upright and a horizontal face at the opposite side, a carriage movable on said support, an antifriction bearing carrying said carriage and engaging both said horizontal and upright faces at said opposite side of said track member, and an antifriction bearing yieldingly carried by said carriage and engaging on said upright face at said one side, said track member being thus engaged horizontally between a pair of sets of antifriction bearings one of which supports weight from said slide.

4. In combination, a support, a track member on said support presenting an upright face at one side and an upright and a horizontal face at the opposite side, a carriage movable on said support, an antifriction bearing carrying said carriage and engaging both said horizontal and upright faces at said opposite side of said track member, an arm pivoted for horizontal swinging, an antifriction bearing carried by said arm and engaging on said upright face at said one side of said track member, and yielding means acting on said arm to press said second-mentioned bearing against said track member, said track member being thus engaged horizontally between a pair of sets of antifriction bearings, one of which supports weight from said slide.

5. In combination, a pair of members comprising a support and a carriage movable on said support, an antifriction bearing cartridge having an endless track for antifriction elements and provided with a straight stretch, means for rockably mounting said cartridge on one of said members, the other of said members having a track opposed to said straight stretch, and antifriction elements in said endless track and engaging said member track.

6. In combination, a pair of members comprising a support and a carriage movable on said support, an antifriction bearing cartridge having an endless track for antifriction elements and provided with a straight stretch, a pivot carried by one of said members and attaching said cartridge thereto for rocking motion about the axis of said pivot, the other of said members having a track opposed to said straight stretch, and antifriction elements in said endless track and engaging said member track.

7. In combination, a support, a carriage movable on said support, an antifriction bearing cartridge having an endless track for antifriction elements and provided with a straight stretch, a pivot carried by said carriage and attaching said cartridge thereto for rocking motion about the axis of said pivot, said support having a track opposed to said straight stretch, and antifriction elements in said endless track and engaging said member track.

MERTON H. ARMS.